(12) United States Patent
Buchanan et al.

(10) Patent No.: US 9,542,600 B2
(45) Date of Patent: Jan. 10, 2017

(54) CLOUD FEATURE DETECTION

(71) Applicant: BAE SYSTEMS PLC, London (GB)

(72) Inventors: Roderick Buchanan, Preston (GB); James Duncan Revell, Bristol (GB)

(73) Assignee: BAE SYSTEMS PLC, London (GB)

( * ) Notice: Subject to any disclaimer, the term of this patent is extended or adjusted under 35 U.S.C. 154(b) by 29 days.

(21) Appl. No.: 14/442,164

(22) PCT Filed: Nov. 11, 2013

(86) PCT No.: PCT/GB2013/052961
§ 371 (c)(1),
(2) Date: May 12, 2015

(87) PCT Pub. No.: WO2014/072737
PCT Pub. Date: May 15, 2014

(65) Prior Publication Data
US 2016/0283774 A1    Sep. 29, 2016

(30) Foreign Application Priority Data

Nov. 12, 2012  (EP) ..................................... 12275171
Nov. 12, 2012  (GB) .................................... 1220316.2

(51) Int. Cl.
*G06K 9/00*     (2006.01)
*G06K 9/62*     (2006.01)
(Continued)

(52) U.S. Cl.
CPC ............. *G06K 9/0063* (2013.01); *B64D 47/08* (2013.01); *G06K 9/4647* (2013.01);
(Continued)

(58) Field of Classification Search
CPC ..................................... G06K 9/00; H04N 1/00
(Continued)

(56) References Cited

U.S. PATENT DOCUMENTS

| 6,504,951 B1 * | 1/2003 | Luo | .................... G06K 9/00664 382/165 |
| 6,512,846 B1 * | 1/2003 | Luo | ....................... G06T 7/0042 382/164 |
| 7,062,085 B2 * | 6/2006 | Luo | ......................... G06K 9/38 382/165 |

FOREIGN PATENT DOCUMENTS

KR    20130027356        3/2013
WO    2006129218 A1      7/2006

OTHER PUBLICATIONS

M. P. Souza-Echer et al, "A Simple Method for the Assessment of the Cloud Cover State in High-Latitude Regions by a Ground-Based Digital Camera", Journal of Atmospheric and Oceanic Technology, vol. 23, No. 3, Mar. 2006 (Mar. 2006), pp. 437-447, 11 pages.
(Continued)

*Primary Examiner* — Abolfazl Tabatabai
(74) *Attorney, Agent, or Firm* — Maine Cernota & Rardin

(57) ABSTRACT

Disclosed are apparatus and a method for detecting cloud features. The method comprises: obtaining (402) image data (401); identifying (404) regions of the image data corresponding to a below-horizon region and an above-horizon region; classifying (404) one or more parts of the above-horizon region as a cloud feature; determining (409) an identification model specifying a visual appearance of some or all of the parts of the above-horizon region that have been classified as a cloud feature; and using the determined identification model, classifying (404), as cloud features, those regions of the of the below-horizon region whose visual appearance is as specified by the identification model.

19 Claims, 4 Drawing Sheets

(51) Int. Cl.
  *G06K 9/46* (2006.01)
  *B64D 47/08* (2006.01)
  *G08G 5/00* (2006.01)
  *H04N 5/225* (2006.01)
(52) U.S. Cl.
  CPC ......... *G06K 9/4652* (2013.01); *G06K 9/6284* (2013.01); *G08G 5/0091* (2013.01)
(58) Field of Classification Search
  USPC ........ 382/103, 236, 107; 348/169, 170, 171, 348/172, 352
  See application file for complete search history.

(56) References Cited

OTHER PUBLICATIONS

Dahlkamp, Hendrik, "Self-supervised Monocular Road Detection in Desert Terrain", http://robots.stanford.edu/papers/dahlkamp.adaptvision06.pdf, 7 pages.
"Due Regard Capability for Unmanned Aircraft Systems Based on Intelligent Cloud Detection and Avoidance", Air Force SBIR/STTR Innovation Stories, Jun. 24, 2012 (Jun. 24, 2012), XP055061016, Retrieved from the Internet: URL: http://www.afsbirsttr.com/Publications/SBIRImpactStory.aspx [retrieved on Apr. 24, 2013], 3 pages.
Hieu Nguyen; Joseph Yadegar; Jim Utt; Bonnie Schwartz,"EO/IR Due Regard Capability for UAS Based on Intelligent Cloud Detection and Avoidance", Apr. 20, 2010-Apr. 22, 2010, AIAA Infotech@Aerospace 2010, Atlanta, Georgia, http://arc.aiaa.orgidoilabs/10.2514/6.2010-3338, 11 pages.
Chaitanya Raju, Sakina Zabuawala, Sreekar Krishna, Joseph Yadegar, "A Hybrid System for Information Fusion with Application to Passive Ranging", UtopiaCompression Corporation, Submitted to IPCV'07—The 2007 International Conference on Image Processing, Computer Vision, and Pattern Recognition, 8 pages.
Staffan Rydergard, "Obstacle Detection in a See-and-Avoid System for Unmanned Aerial Vehicles", Master's Thesis in Computer Science at the School of Vehicle Engineering, Royal Institute of Technology, 2004, Stockholm, Sweden, Retrieved from the Internet: URL:http://www.nada.kth.se/utbildning/grukth/exjobb/rapportlistor/2004/rapporter04/rydergard_staffan_04013.pdf, [retrieved on Apr. 25, 2013], 71 pages.
De Croon, G C H E; De Wagter C; Remes, B D W; Ruijsink, R; "Sky Segmentation Approach to obstacle avoidance",2011 IEE Aerospace Conference, May 3, 2011, pp. 1-16, 16 pages.
Herbert Bay, Tinne Tuytelaars, and Luc Van Gool, "SURF: Speeded Up Robust Features", Katholieke Universiteit Leuven, 14 pages.
Charles Patchett et al, "The Development of an Advanced Autonomous Integrated Mission System for Uninhabited Air Systems to Meet UK Airspace Requirements", Intelligent Systems Modelling and Simulation (ISMS), 2010 International Conference on, IEEE, Piscataway, NJ, USA, Jan. 27, 2010 (Jan. 27, 2010), pp. 60-64, 5 pages.
Rob Whitehouse, "Unlocking the civil UAV market", Aerospace International, Sep. 2010 (Sep. 2010), pp. 26-28, London, Retrieved from the Internet: URL:http://www.roke.co.uk/resources/articles/Unlocking-the-Civil-UAV-Market.pdf [retrieved on May 7, 2013], 3 pages.
EP Search Report dated May 16, 2013 of EP Patent Application No. 122751.2 filed Nov. 12, 2012, 8 pages.
GB Search Report dated May 10, 2013 of GB Patent Application 1220316.2 filed Nov. 12, 2012, 3 pages.
McKenna, Stephen J.—Tracking colour objects using adaptive mixture models, Image and Vision Computing vol. 17, 1999, pp. 225-231, Elsevier Science B.V., PII: S0262-8856(98)00104-8.
Barniv, Yair—"Passive Ranging Using Image Expansion", IEEE Transactions on Aerospace and Electronic Systems vol. 31, No. 1, Jan. 1995; pp. 358-374.
C. Raju, S. Zabuawala, S. Krishna & J. Yadegar, "A Hybrid System for Information Fusion with Application to Passive Ranging", UtopiaCompression Corporation, Internal document submitted to IPCV'07—The 2007 International Conference on Image Processing, Computer Vision, and Pattern Recognition.
J. Sola, A. Monin, M. Devy & T. Lemaire, "Undelayed Initialization in Bearing Only SLAM", In Proc. International Conference on Itelligent Robots and Systems, 2005.
Sonka, Image Processing, Analysis and Machine Vision, (Brooks/Cole 2007) p. 16.
H. Bay, A. Ess, T.Tuytelaars, & L.V. Gool, "SURF: Speeded Up Robust Features", Computer Vision and Image Understanding, vol. 110, No. 3, pp. 346-359, 2008) p. 16.
Nguyen, Porway et al. H. Nguyen, J. Porway, P. Ramu, A. Ganguli & J. Yadegar, "EO/IR Due Regard Capability for UAS Based on Intelligent Cloud Detection and Avoidance", AIAA Infotech@Aerospace 2010, p. 17.
J. Shi & C. Tomasi, "Good Features to Track", IEEE Conf. Computer Vision and Pattern Recognition, 1994, pp. 593-600.
S. Avidan & A. Shashua, 'Trajectory Triangulation of Lines: Reconstruction of a 3D Point Moving Along a line from a Monocular Image Sequence', IEE Transactions on Pattern Analysis and Machine Intelligence, vol. 22, No. 4, Apr. 2000, pp. 348-357.

\* cited by examiner

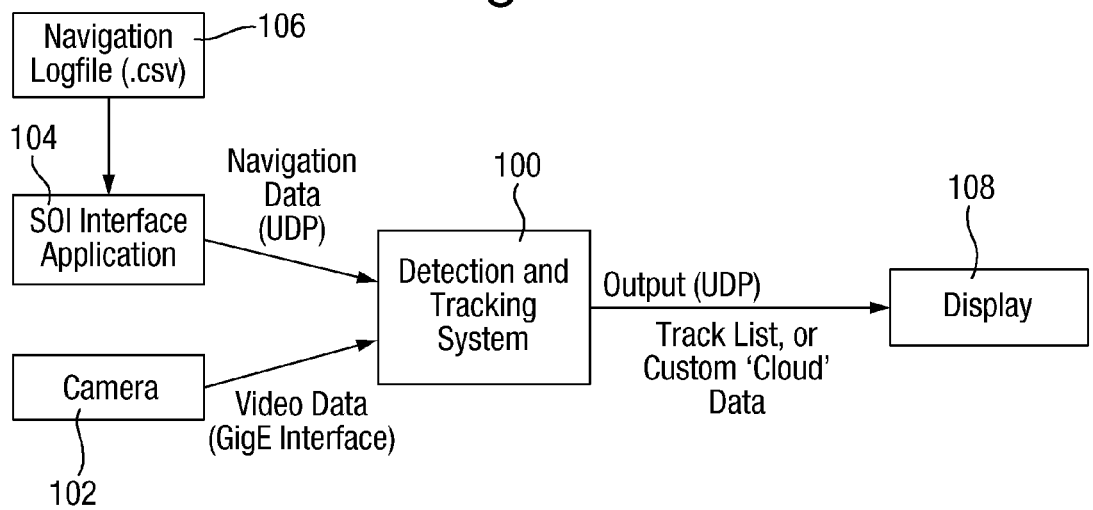
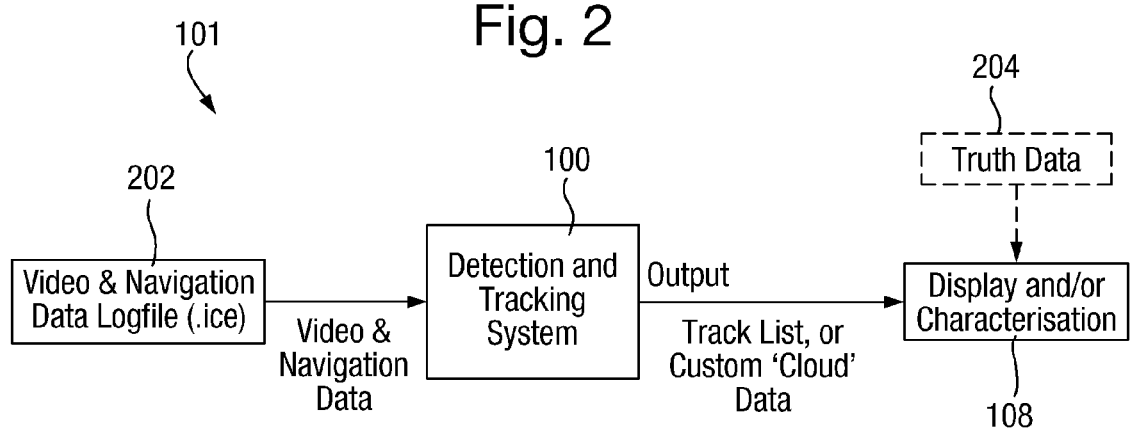

Fig. 6(a)
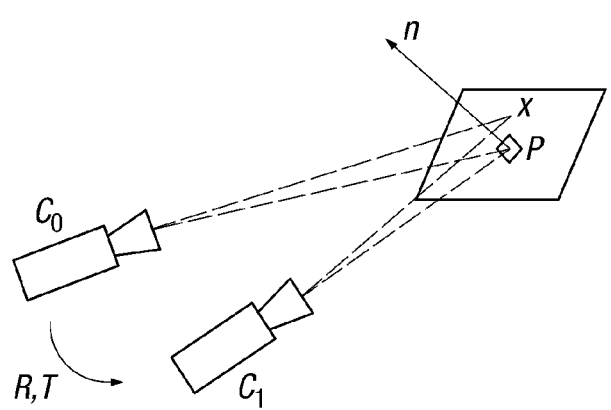
Fig. 6(b)
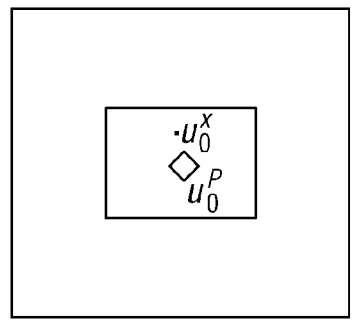
Image From $C_0$
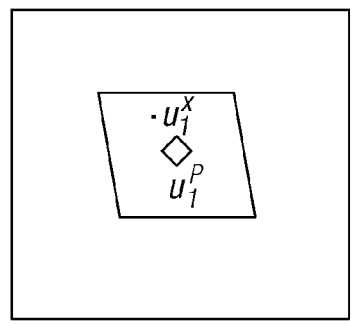
Image From $C_1$
Fig. 7
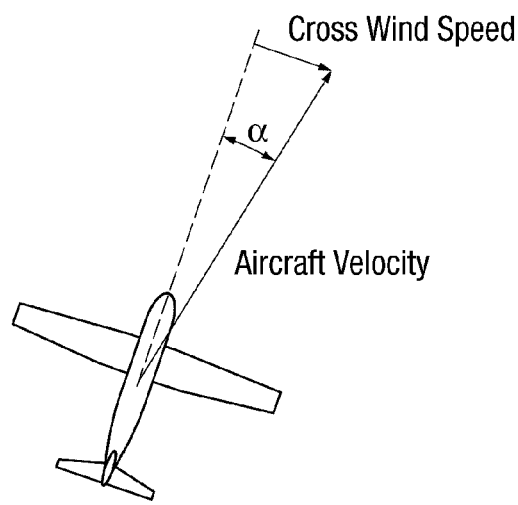

CLOUD FEATURE DETECTION

RELATED APPLICATIONS

This application is a national phase application filed under 35 USC §371 of PCT Application No. PCT/GB2013/052961 with an International filing date of Nov. 11, 2013, which claims priority to GB1220316.2, filed Nov. 12, 2012 and EP12275171.2, filed Nov. 12, 2012. Each of these applications is herein incorporated by reference in their entirety for all purposes.

FIELD OF THE INVENTION

The present invention relates to detection of cloud features.

BACKGROUND

In situations such as autonomous control of aircraft it can be desirable to automatically detect cloud features without relying on human vision/input. A system that detects cloud features can be combined with a route planner or the like to help an aircraft avoid bad weather or other crafts/objects that may not be visible through clouds. Further, obtaining range information relating to cloud features is complicated due to cloud motion and the typically small triangulation baseline.

SUMMARY OF THE INVENTION

In a first aspect, the present invention provides a method of detecting cloud features including: obtaining image data (e.g. by a camera located onboard an aircraft); identifying regions of the image data corresponding to a below-horizon region and an above-horizon region; classifying one or more parts of the above-horizon region as a cloud feature; determining an identification model specifying a visual appearance of some or all of the parts of the above-horizon region that have been classified as a cloud feature; and, using the determined identification model, classifying, as cloud features, those regions of the of the below-horizon region whose visual appearance is as specified by the identification model.

The step of classifying one or more parts of the above-horizon region as a cloud feature may comprise classifying one or more parts of the above-horizon region as sky, and classifying, as a cloud feature, each part of the above-horizon region that has not been classified as sky.

Classifying a part of the above-horizon region as sky may comprise selecting a part of the above-horizon region having a smooth image gradient, and classifying the selected part as sky if properties of pixels within the select part fulfil one or more predetermined criteria.

The one or more predetermined criteria may include a time of day, lighting conditions, environmental conditions, etc.

The properties of pixels may be colour properties of the pixels such as a property of a pixel having a strong blue colour (or other colour such as violet or pink).

A pixel may be said to have a strong blue colour if (i) blue is a strongest RGB component of the pixel, and/or (ii) a saturation value of the pixel is above a predefined threshold.

Selecting a part of the above-horizon region having a smooth image gradient may include computing an image gradient for each of a plurality of channels (e.g. the RGB channels) of the image data. Selecting a part of the above-horizon region having a smooth image gradient may further include computing an image gradient for in directions tangential and normal to the horizon, for example by: (i) using image data, determining a horizon line; (ii) determining a first direction parallel to the horizon line; (iii) calculating image gradients in a direction parallel to the first direction; (iv) determining a second direction perpendicular to the horizon line; and (v) calculating image gradients in a direction parallel to the second direction.

The method may include smoothing the RGB channels by averaging over a local circular neighbourhood, and summing the RGB channels to produce a combined smoothness value of a pixel in the tangential and normal directions.

The method may include classifying parts of the below-horizon region as surface.

The identification model may be a colour based model based on an appearance (e.g. a visual appearance) of at least one said cloud feature in the above-horizon region.

The method may include a feature extraction step to detect visual features corresponding to a potential said cloud feature in a greyscale version of the image data. The feature extraction detection may include searching over multiple scales of the image data and extracting image patches that contain texturing and local intensity peaks. The method may include associating said visual features over multiple frames of the image data using navigation data. The association of the visual features may be used to produce temporal tracks of motion of the visual features through image space. The method may include generating information relating to range of a said cloud feature by computing scaling of a said visual feature corresponding to the cloud feature from an earlier said frame into a later said frame. The method may include generating information relating to range of a said cloud feature by: estimating velocity of movement of air in which the cloud feature is located; obtaining information regarding position and velocity of an aircraft that produced the image data at a time corresponding to the frame of the image data, and using a triangulation technique based on the estimated velocity, the aircraft position and the aircraft velocity to determine the range of the cloud feature.

In a further aspect the present invention provides apparatus for detecting cloud features including: one or more cameras configured to obtain image data, and one or more processors operatively coupled to the one or more cameras and configured to: identify regions of the image data corresponding to a below-horizon region and an above-horizon region; classify one or more parts of the above-horizon region as a cloud feature; determine an identification model specifying a visual appearance of some or all of the parts of the above-horizon region that have been classified as a cloud feature; and using the determined identification model, classify, as cloud features, those regions of the of the below-horizon region whose visual appearance is as specified by the identification model.

In a further aspect the present invention provides an aircraft (e.g. an unmanned or autonomous aircraft) comprising apparatus according to the preceding aspect.

In a further aspect the present invention provides a program or plurality of programs arranged such that when executed by a computer system or one or more processors it/they cause the computer system or the one or more processors to operate in accordance with the method of any of the previous aspects.

In a further aspect the present invention provides a machine readable storage medium storing a program or at least one of the plurality of programs according to the preceding aspect.

Aspects of the present invention are intended to address at least some of the abovementioned problems. Aspects of the present invention can perform scene segmentation and classification to determine the regions of cloud, typically by assuming that only sky and cloud exist in the image above the horizon and only cloud and surface/ground exist below. As sky and cloud can appear to have very similar colours, aspects of the present invention can use texturing and gradient information to separate the sky from the cloud. A colour based model can then be maintained based on the appearance of the cloud observed above the horizon and may be used to classify below the horizon. This approach can be relatively fast and achieves reasonable performance for a variety of scenarios and lighting conditions.

Range estimates can be generated by embodiments using one of two complementary methods for feature localisation. The first can be based on local optic flow divergence and obtained from measuring the expansion of local image features over time. The second method can use the current wind speed and direction which is obtainable from the aircraft's atmospheric sensors. This can allow the motion of the clouds at similar altitudes to be inferred and enable range to a moving feature to be estimated based on triangulation techniques.

According to an aspect of the present invention there is provided a method of detecting cloud features, the method including or comprising: obtaining image data; identifying regions of the image data corresponding to a below-horizon region and an above-horizon region; classifying parts of the above-horizon region as a cloud feature or sky, and outputting information relating to a location of at least one of the parts classified as a said cloud feature.

The method may further include classifying parts of the below-horizon region as cloud feature or surface The method may include computing a colour based model based on appearance of at least one said cloud feature in the above-horizon region. The colour based model may be used to classify a said part of the below-horizon region as a said cloud feature.

The method may classify a said part of the above-horizon region by: selecting a said part of the above-horizon region based having a smooth image gradient, and classifying the selected part as sky based on pixels having a strong blue colour within the selected part.

A said pixel in the selected part may be said to have a strong blue colour if: (i) blue is a strongest RGB component of the pixel, and (ii) a saturation value of the pixel is above a predefined threshold.

The method may include computing the image gradient separately for RGB channels of the image data in directions tangential and normal to the horizon.

The method may further include: smoothing the channels by averaging over a local circular neighbourhood; summing the channels to produce a combined smoothness value of a pixel in the tangential and normal directions.

The method may perform image smoothing and down sampling to smooth noisy high resolution said image data to produce smooth lower resolution (e.g. a factor of ¼ or ⅙) images.

The method may include a feature extraction step to detect visual features corresponding to a potential said cloud feature in a greyscale version of the image data. This detection may search over multiple scales of the image data and extract image patches that contain texturing and local intensity peaks. A said image patch can be discarded if the image patch is located in a said part previously classified as sky.

The method may associate said visual features over multiple frames of the image data using navigation data. The association of the visual features can be used to produce temporal tracks of motion of the visual features through image space.

The method may include generating information relating to range of a said cloud feature by computing scaling of a said visual feature corresponding to the cloud feature from an earlier said frame into a later said frame.

The method may include generating information relating to range of a said cloud feature: estimating velocity of movement of air in which a said cloud feature is located; obtaining information regarding position and velocity of an aircraft that produced the image data at a time corresponding to the frame of the image data, and using a triangulation technique based on the estimated velocity, the aircraft position and the aircraft velocity to determine the range of the cloud feature.

The step of estimating the velocity of movement of the air may be based on measured atmospheric temperature and pressure and the recoded velocity of the aircraft.

According to another aspect of the present invention there is provided a method of producing range information relating to a cloud feature substantially as described herein.

According to another aspect of the present invention there is provided apparatus, such as an aircraft, including a processor configured to execute a method substantially as described herein.

According to other aspects of the present invention there are provided computer program elements comprising: computer code means to make the computer execute methods substantially as described herein. The element may comprise a computer program product.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

BRIEF DESCRIPTION OF THE DRAWINGS

The invention may be performed in various ways, and, by way of example only, embodiments thereof will now be described, reference being made to the accompanying drawings in which:

FIG. 1 is a block diagram of an on-line embodiment of the cloud feature detection system;

FIG. 2 is a block diagram of an off-line embodiment of the cloud feature detection system;

FIG. 6($a$) illustrates a geometric calculation performed by an embodiment of the present disclosure;

FIG. 6($b$) illustrates the field of view of $C_0$ and $C_1$ as shown in FIG. 6($a$); and FIG. 7 illustrates a cross-wind calculation used by some embodiments.

DETAILED DESCRIPTION

Figure 3:
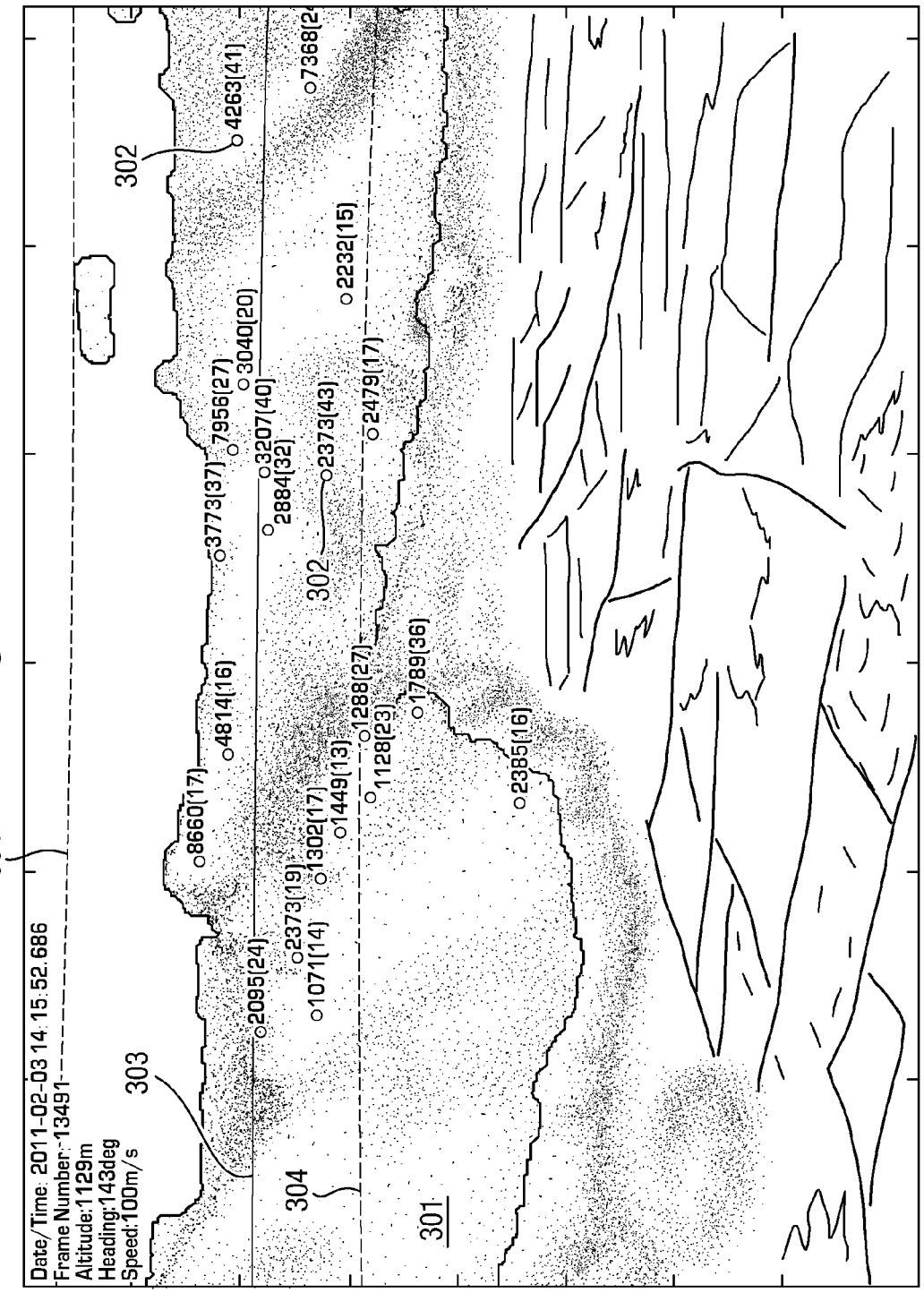
FIG. 3 is an example of a screen display produced by an embodiment of the system.

Embodiments of the system are capable of running in on-line and off-line modes. System diagrams for these operational modes are given in FIGS. 1 and 2, respectively. Typically, embodiments of the system running in the on-line mode will include components based on an aircraft, which may be at least partially autonomous. The system 101 includes a computing device 100, including a processor and memory configured with code that executes methods as described herein. Embodiments of the system can be built in MATLAB™, drawing on off-the-shelf toolboxes for video data acquisition and UDP input/output. The computing device can receive inputs from data sources or devices over wired or wireless communications links. The system can receive as inputs platform navigation data and video data, either from a log file (off-line mode) or directly over a network interface (on-line mode). It will be appreciated that the arrangements of components shown in the Figures are exemplary only and that the functions performed by the various components could be integrated or distributed in a different manner.

In the on-line embodiment of FIG. 1, the computing device 100 receives as input image data from a camera device 102, as well as navigation data (e.g. in the known UDP format) from an optional SOI interface application 104, which comprises middleware communication software used to send and receive data between systems. The navigation data can include latitude, longitude, altitude, pan, tilt, roll and rates data at least relating to the aircraft as it was capturing the image data.

The application 104 receives data from a navigation logfile 106 (in the known .csv data format). The camera 102 is typically a video camera, but, generally, could be any device capable of producing a sequence of image-based data in any suitable manner and data format. In the off-line embodiment of FIG. 2, the computing device 100 receives input from a data source 202 in the form of a video and navigation logfile (in the known .ice data format in the example).

The system can supply data in the form of a custom cloud data type, which may be in the form of a coarse and non-uniform mesh over the image. An example data is shown below:

| Field Name | Type | Description |
|---|---|---|
| cloud_type | | |
| timestamp | uint64 | Nano seconds since 1970 |
| validity_tag | int32 | Validity (0 = null, 1 = normal, 2 = test, 3 = no data) |
| no_of_cloud_elements | int32 | Number of mesh cells in cloud_elements |
| cloud_elements | cloud_cell_array_type (typedef cloud_cell_type [20]) cloud_cell_type | |
| cell_number | int32 | |
| cloud_classification | float32 | Fraction of cell classified as cloud |
| range_validity | int32 | Has the range estimate to clouds in this cell been successfully computed. |
| range | float32 | Estimated mean range to clouds in this cell (meters) |
| range_std_dev | float32 | Estimated standard deviation of mean range to clouds in this cell (meters) |
| cell_centroid_azimyth | float32 | Ange (in rad) of cell centroid measured in the horizontal plane from north (clockwise positive) |
| cell_centroid_elevation | float32 | Angle (in rad) of cell centroid above the horizontal plane (positive up) |

In some embodiments, each cell in the mesh/grid will have a classification (fraction of cloud that fills that cell) and contain range information produced from the localised cloud features. If the range information has not been able to be determined, an invalid flag for that cell will be set. In addition to the grid, a binary flag shall also be included that represents if there exists well localised features that lie on the earth's surface, indicating the surface is visible. The structure of the mesh will be defined in the system configuration file.

For on-line operation these outputs may be supplied over UDP, while for off-line operation these can be simply displayed and/or compared against ground truth 204 (human-verified information regarding the actual positions of clouds). In off-line operation the external navigation logfile will not be used, and instead the navigation data retrieved from the .ice logfile. In both embodiments of FIGS. 1 and 2, the computing device 104 is connected to a display device 108. The display device can be used to produce a display similar to that of FIG. 3 that provides information regarding the positions of detected clouds. This can be used by a pilot or navigator onboard the aircraft in the on-line embodiment of FIG. 1 to help fly the aircraft. As shown in FIG. 3, detected cloud areas can be depicted as (red) transparent regions 301; localised feature patches with ranges less than 10 km as (blue) points 302, with associated range estimate supplied in meters (percentage error in estimate supplied in brackets); The horizon line 303 is shown as solid (grey) line; plus/minus four degree limits as dashed (grey) lines 304. It will be appreciated that the information presentation techniques shown are exemplary only and many others are possible, e.g. the cloud feature information need not be superimposed on an actual image and could, instead, be a plan view showing graphical approximations of the cloud features with respect to a graphical representation of the aircraft.

Figure 4:
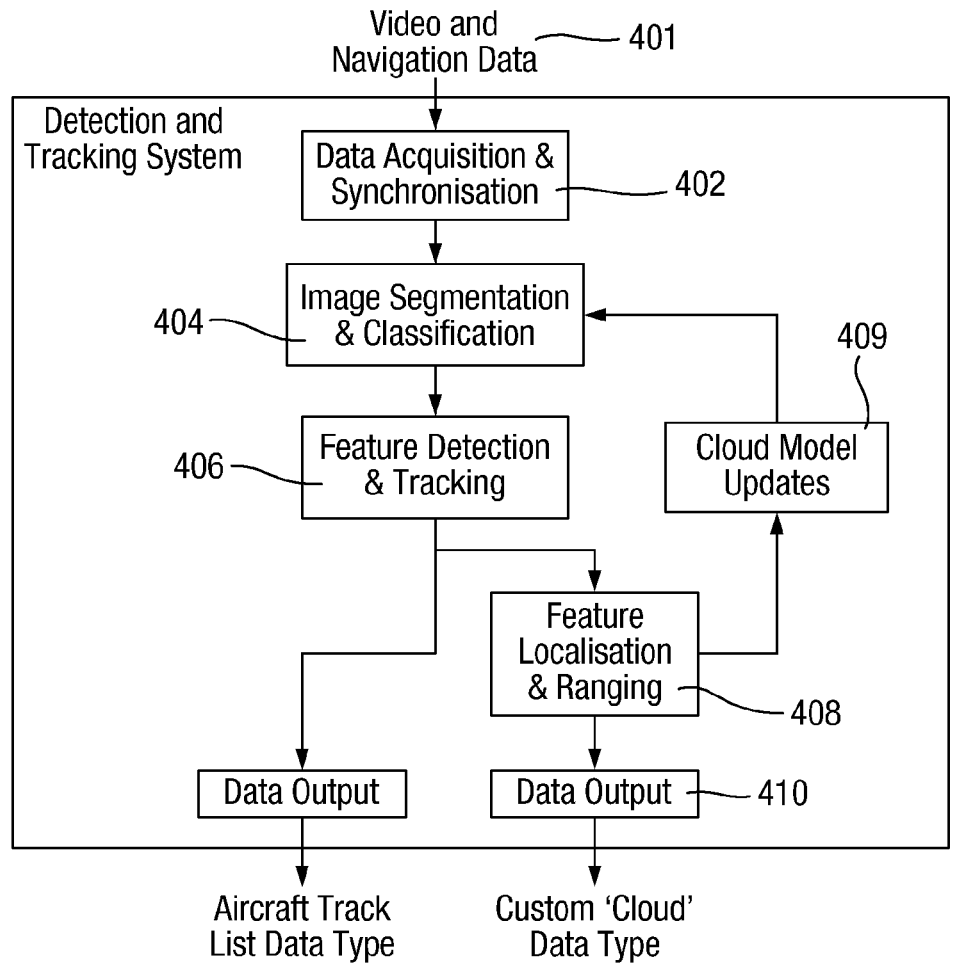
FIG. 4 is a flowchart showing steps performed by the embodiment.

FIG. 4 shows a processing pipeline of an embodiment of the detection and tracking system 101 that includes an aircraft detection module in addition to the cloud detection system. The aircraft detection system is optional/separable and will not be not described in detail herein. Centre modules (steps 402, 404, 406) are common for aircraft and cloud detection, whilst modules on the right-hand side (408, 409, 410) are only used for cloud detection. The skilled person will appreciate that these steps are exemplary only and that in alternative embodiments, some of them may be omitted and/or re-ordered. Further, the method can be implemented using any suitable hardware, programming language and data structures.

As discussed above, the system 101 receives as inputs the video and navigation data 401, which is available as either Live data or Logged data. In some embodiments, the camera 102 acquires and sends 5 megapixel images at a rate of 15 Hz. Navigation data can be sent at a rate of 50 Hz. The available logfiles contain data captured at similar rates. In on-line embodiments, the live video data is transmitted by the camera using the GiGE vision protocol and can be acquired through the Matlab Image Acquisition Toolbox. Navigation data can be transmitted through a UDP interface and can be acquired using the Matlab Instrument Control Toolbox. For offline embodiments, the main source of logged data can be an .ice logfile containing video and navigation data. These data sources can be logged together and may have a synchronisation error of up to 5 ms. In alternative embodiments, video file formats (e.g. mp4) and/or Nav log file format (e.g. .csv) can be added.

The input data 401 is processed by a data acquisition and synchronisation step 402. As part of the data synchronisation process, when combining multiple data sources (potentially operating at different rates) it is preferable to present a synchronised packet. This contains the appropriate data packets that are most accurately time aligned with each other. The construction of this packet is triggered on the arrival of new video frames. There can be three modes of operation in which the interpretation of time will differ: live operation, live rate playback of logged data and rate independent playback:

The live operation mode corresponds to on-line operation and the system acquires data as fast as it can process it. Data that cannot be processed by the system will not be buffered by the system and will be dropped.
  In the live rate playback mode, data is played back at the rate at which it was captured. There is a one-to-one ratio of simulated system time to real time. If the algorithmic components of the system take excessive time to run, the data that would have been played back during that time will be dropped and not processed. This mode can be used to characterise the performance a live system may achieve.
  In the rate independent playback mode, data can be played back at a different (variable) rate to that at which it was captured. This allows all data or a specific fraction to be processed by the system as desired. Offline embodiments typically operate in this mode.

Following step 402, an image segmentation and classification step 404 is executed by the system 101. This can involve image smoothing, horizon extraction and image segmentation to detect regions of sky, cloud and surface. The image smoothing and down sampling part of the step smoothes the noisy high resolution images to produce smooth lower resolution images. Typically, a factor of ¼ or ⅙ is used and the pixels averaged to form the smaller image. The horizon extraction part of the step calculates the position of the horizon e.g. from the known global position of the sensor onboard the aircraft and projected into the image. This allows two regions of the image to be separated before scene classification is attempted. In the scene segmentation and classification part of the step, each image can be segmented into sky, cloud and surface. This is performed by assuming that only sky and cloud exist in the image above the horizon and only cloud and surface exist below the horizon. As sky and cloud can appear to have very similar colours, the texturing and gradient information is used to separate the sky from the cloud. An identification model is then determined based on the appearance of the cloud observed above the horizon. In this embodiment, the identification model is a colour based model as described in more detail later below with reference to FIG. 6. This colour model is subsequently used to classify features below the horizon as cloud. This approach tends to be relatively fast compared to conventional techniques. Furthermore, as the colours/appearance of clouds change depending on lighting conditions, time of day, weather/environmental conditions etc., by using above horizon features identified as cloud to determine a colour model for identifying clouds below the horizon line, the method described herein tends to be advantageously robust for a variety of scenarios and lighting conditions.

At step 406, a Feature Detection and Tracking step is executed, where image features are extracted, associated and tracked over time using the navigation information to form tracks through the image plane. The Feature Extraction part of this step detects salient visual features in the greyscale versions of the images. A detection algorithm searches over multiple scales and extracts image patches that contain texturing and local intensity peaks. Features are discarded if they lie in a region previously classified as sky. All other features are kept. In the Feature Association part of the step the image features are associated over multiple frames using the navigation data to initiate a local search for a similar patch based on standard image processing techniques. The use of the navigation data enables relatively large position and angular displacements between frames, while maintaining reliable feature association. This enables the system to run at a slower frame rate without significant decrease in performance. In the Feature Tracks part of the step the associations between features are used to produce temporal tracks of the motion of the features through image space. This allows reliable features to be selected for further processing. At this stage tracks may be of features located on cloud fronts or the ground surface. Some embodiments of the invention may only identify cloud features in the above-horizon region to reduce processing.

At step 408, a Feature Localisation and Ranging process is executed. Obtaining range information to cloud features tends to be difficult due to cloud motion and the typically small triangulation baseline. This step may employ one of two methods for feature localisation. The first is based on local optic flow divergence (see, for example, Y. Barniv, "Passive Ranging Using Image Expansion", IEEE Trans. Aerospace and Electronic Systems Vol. 31, No. 1 1995 and C. Raju, S. Zabuawala, S. Krishna & J. Yadegar, "A Hybrid System for Information Fusion with Application to Passive Ranging", In Proc. Int. Conf. on Image Processing, Computer Vision, and Pattern Recognition, 2007) and is obtained from measuring the scaling for converting an earlier feature patch into a later one. The greater the scaling implemented, the larger the feature has become and the closer the object is.

The second method uses a user supplied configuration option specifying the current wind speed and direction (obtainable from the aircraft's atmospheric sensors). The wind velocity is used as an input as the range to a feature moving in the same plane as a moving bearing only sensor (i.e. a cloud at the same altitude as the aircraft) is unobservable (see S. Avidan & A. Shashua, "Trajectory Triangulation of Lines: Reconstruction of a 3D Point Moving Along a Line from a Monocular Image Sequence", IEEE Transactions on Pattern Analysis and Machine Intelligence, 2000). To determine if the ground surface is visible and objects on it are resolvable, a check is performed of any salient visual features are well localised and lie at an altitude near ground/sea level.

Figure 5:
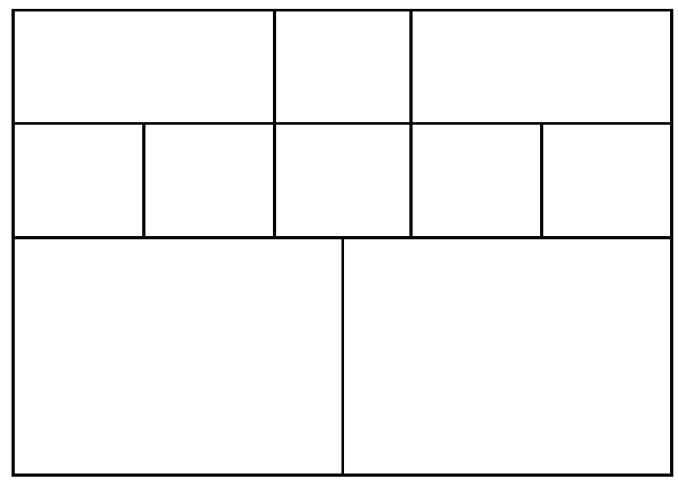
FIG. 5 shows an example mesh used by the embodiment.

The output cloud data type 410 produced by step 408 can comprise a coarse and non-uniform mesh over the image. Each cell in the grid may have a classification (fraction of cell classified as cloud) and contain range information produced from the localised cloud features. In addition to the grid, a binary flag may be included that represents if there exists well localised features that lie on the earth's surface, indicating the surface is visible. An example mesh is given in FIG. 5. In FIG. 5, the mesh is denser in areas of the image that has the same altitude as the aircraft when flying straight and level.

A detailed description of the techniques and mathematical basis for the steps performed by the system 101 will be given below with reference to FIG. 6 onwards. The skilled person will appreciate that it is possible to implement embodiments of the method based on the equations and calculations given below or any mathematical equivalents.

As part of the system modelling, the camera 102 mounted on the aircraft is calibrated. The intrinsic calibration data specifies the internal camera parameters for instantiating a realistic pinhole camera model. This model maps a point in the local camera frame $c=[c_x, c_y, c_z]^T$ to a point in the image $u=[u_x, u_y, 1]^T$ through the nonlinear transform $$u = Mc' \qquad (1)$$

where $c'=[c_x/c_z, c_y/c_z, 1]^T$ and the intrinsic camera matrix M is constructed from the focal length, focal aspect ratio, and image coordinates of the optical axis. The local camera coordinate system is defined with z along the optical axis, y pointing up, x pointing left and the origin at the focal point. The z coordinate of a point will often be referred to as the depth of the point. The image coordinate axes have the origin at the top-left image pixel and x positive right and y positive down. The mapping (1) can be reversed if the depth of the point is known $$c = c_z M^{-1} u \qquad (2)$$

Testing has shown that the lens distortions, which cause the actual pixel locations to differ from that predicted by equation (1), are small compared to the errors introduced by the extrinsic parameters and have not been incorporated into the system. If it is desirable in the future to incorporate the lens distortion model into the system, an image rectification step can be performed prior to all other operations without any further modifications.

An estimate of the location and rotation of the camera on the aircraft with respect to the platforms inertial navigation system (INS), for extrinsic calibration, is also. This allows a translation vector $T_a$ and rotation matrix $R_a$ to be defined that maps a point in the local aircraft frame $a=[a_x, a_y, a_z]^T$ to the local camera frame c $$C = R_a(a - T_a) \qquad (3)$$

The translation vector is constructed from the location of the camera with respect to the INS coordinate frame $T=[T_x, T_y, T_z]^T$, while the rotation matrix is constructed from the required rotations about the x, y, and z axes to transform the INS axis system into the camera's, and can be constructed using the individual rotation matrix components $R_a=R_x(\theta_x)$, $R_y(\theta_y)R_z(\theta_z)$. Herein, the origin of the aircraft coordinate system is centred on the INS antenna and has the x axis pointing forward along the axis of the aircraft, y-axis points out over the right wing and the z axis pointing down through the floor of the aircraft.

To develop a mapping from a world coordinate system to the aircraft frame, a similar operation is performed. The current world coordinate system in use is UTM and assumes that travel is only within a single zone. The axis system defines north as the x-axis, east as the y-axis and down as the z-axis. A translation vector $T_w$ and rotation matrix $R_w$ can be constructed from the estimated latitude, longitude, altitude, roll, pitch and roll of the aircraft, and can be used to map a point in the world $w=[w_x, w_y, w_z]^T$ to a point in the aircraft frame a $$a = R_w(w - T_w) \qquad (4)$$

This allows a single translation and rotation component to be constructed for the camera that encapsulates the INS solution and camera mounting offset $$c = R_a(R_w(w - T_w) - T_a) \qquad (5)$$
$$= R(w - T)$$

where $R=R_a R_w$ and $T=T_w - R_w^{-1} T_a$.

To perform cloud detection (part of step 404 of FIG. 4), the image is first split by projecting the location of the horizon into the image using the estimated location and rotation of the camera from the extrinsic calibration information and INS solution. This allows two regions, corresponding to above and below the horizon, to be extracted. Various classification techniques have been explored to further classify these two regions into sky, cloud and surface using a variety of image features encompassing colour and texture information and the inventors made a selection based on classification performance and speed. This uses a tuned domain specific model to extract the sky, and a cloud model 409 learnt and refined online from the remaining areas that are not sky and above the horizon (cloud). This model is then used to classify the region below the horizon to determine other areas of cloud. This method does not attempt to model the appearance of ground, which can vary greatly.

To perform sky segmentation and classification (also part of step 404), the observed blueness and smoothness properties of sky may be exploited to classify the region above the horizon as follows.

Firstly, smooth regions of the above horizon portion can be identified or extracted. In this embodiment, the terminology "smooth" is used to refer to a region in which, for each cell/pixel in that region, the RGB gradient across that cell/pixel (e.g. in both horizontal and vertical directions) is below a predetermined threshold value. In some embodiments, a different appropriate definition of smoothness is used.

Secondly, in this embodiment, the identified "smooth regions" of the above horizon portion are classified as sky if they contain pixels with a strong blue colour. In other embodiments, one or more different colour criteria may be used to classify a region as sky. The appearance/colour of the sky may be dependent, for example, upon the local time of day, local weather conditions etc. For example, at certain times of the day, the sky may appear to have a violet or pink or other colour as opposed to a strong blue colour. Thus, depending on the time of day or other parameter, a colour criterion for classifying the sky may be selected and used in the sky classification. Also, in some embodiments, one or more different criteria instead of or in addition to one or more colour criteria are used. For example, in other embodiments, a criterion based on hue, saturation, lightness/luminance properties, or any other image properties, may be used to classify the sky.

It has been realised that, generally, the sky tends to be smoother in the direction that points parallel to the horizon compared to a direction that is perpendicular to the horizon. Thus, in this embodiment, image gradients are computed separately for the image's RGB channels in directions tangential ($R_T$, $G_T$, $B_T$) and normal ($R_N$, $G_N$, $B_N$) to the horizon line. In this embodiment, this may be performed as follows. Firstly, using an image, a first direction is calculated, the first direction being parallel to the horizon line in the image. Secondly, for each of the image cells/pixels and for each of the image's colour channels (i.e. for each of the red, green, and blue colour channels), image gradients in the first direction are computed. Thirdly, using an image, a second direction is calculated, the second direction being perpendicular to the horizon line in the image. Fourthly, for each of the image cells/pixels and for each of the image's colour channels, image gradients in the second direction are computed.

The computed separate RGB channel gradients may then be further smoothed by averaging over a local circular neighbourhood. After the smoothing, the RGB channels are summed to produce a combined smoothness value of a pixel in the tangential and normal directions. These are then thresholded to extract sets of connected pixels that belong to smoothly varying regions.

As cloud can also have smoothly varying regions, the smoothness property alone cannot always be used to detect regions of sky. In this embodiment, only those regions that contain pixels with a strong blue colour are labelled as sky. Here, strong blue is defined using two heuristics: (i) blue must be the strongest RGB component of the pixel, and (ii) the pixel's saturation value, defined for each pixel as 1−min(R,G,B)/max(R,G,B), must be above a predefined threshold. The threshold value can be determined empirically from experiments and can be a user controlled value to allow operator 'tuning'.

A limitation of this approach can be that it may fail to detect an edge between sky and cloud due to ill defined (e.g. misty) cloud borders. An option to improve the performance under these conditions is to combine the method with a Markov random field based classification scheme that is better able to determine class boundaries and apply global constraints.

For cloud segmentation and classification (also part of step 404), the region above the horizon not classified as sky is assumed to be cloud and is used to build and maintain a colour model for the visual appearance of clouds. This model allows cloud to be detected below the horizon. The model consists of a set of weighted Gaussian distributions in three dimensional RGB space and captures the variations in colours that have recently been observed in the clouds above the horizon and allows similar regions below the horizon to be detected. It is based on the self-supervised learning approach of H. Dahlkamp, A. Kaehler, D. Stavens, S. Thrun, & G. Bradski, "Self-supervised Monocular Road Detection in Desert Terrain", In Proc. of Robotics: Science and Systems, 2006, and enables the scene below the horizon to be classified as cloud or not cloud. A similar approach to colour based object detection algorithm is given in S. McKennaa, Y. Rajab, S. Gong, "Tracking colour objects using adaptive mixture models", Image and Vision Computing, Vol. 17, 1999, which could also be used.

In this embodiment, the identification model determined from clouds above the horizon and used to classify regions below the horizon is a colour model. However, in other embodiments, one or more different types of identification model may be used instead of or in addition to the colour model. For example, in other embodiments, a model based on hue, saturation, lightness/luminance properties, or any other properties, may be used to for model the visual appearance of the clouds.

In this embodiment, the colour model takes as input the RGB values of all the pixels above the horizon and not sky. From this a k-means clustering algorithm is used to produce a set of clustered points. This clustering allows a Gaussian mixture model to be constructed which summarises the observed clouds into means and covariances in RGB space. This model is produced from the current image and is used to update a separate Gaussian mixture model that persists during the entire system operation and slowly tracks the changing visual characteristics of the observed clouds. Details of the initialisation and update scheme can be found in the Dahlkamp article referenced above.

Optionally, to improve the performance of the classification system, and correctly classify clouds below the horizon that look vastly different to those above, the appearance model may also be updated based on detected image patches that have been tracked and well localised and known not to lie on the earth's surface (see feedback loop in FIG. 4). This relies on the ability to well localise the features, however this has proved difficult in preliminary testing. The classification performance of the system may be improved by separately classifying haze that often occurs near the horizon and shares similar colours to some clouds. This may be performed through smoothness conditions in a similar fashion to the sky.

This image segmentation and cloud detection stage can be characterised by manually segmenting a set of images sparsely located throughout the supplied datasets. From this labelled dataset false positive rates for the classes above and below the horizon will be calculated. This provides results that measure the ability of the sky and cloud to be separated based on the tuned sky model, and the ability of the determined/learnt colour based model to classify cloud below the horizon.

The feature detection and tracking step 406 can involve steps of image feature detection, feature association and tracking. During the image feature detection, to develop range estimates to the detected clouds, features are extracted tracked and localised. To localise arbitrary features in 3D space from a bearing only sensor, such as a camera, the features may be tracked over time and the information used to recover its position. Salient feature patches are extracted from image's greyscale intensity using the scale invariant determinant of Hessian (see M. Sonka, "Image Processing, Analysis, and Machine Vision", Brooks/Cole, 2007). This automatically determines the location and scale of salient intensity texturing in the image. Square image patches are extracted from the image and stored for later use in the tracking algorithm. This process is similar to the feature detector employed in the speeded up robust feature (SURF) algorithm (H. Bay, A. Ess, T. Tuytelaars, & L. V. Gool, "SURF: Speeded Up Robust Features", Computer Vision and Image Understanding, Vol. 110, No. 3, pp. 346-359, 2008). The patterned features extracted by this approach are expected to be produced by the texturing often found on cloud surfaces. This texturing is produced by the diffuse reflection of light on the irregular surface and is expected to remain relatively invariant to the viewing angle. These properties are crucial to enable the accurate and robust feature tracking and localisation.

Occasionally, features are detected that lie in the sky and are caused by the interaction between the natural intensity gradient of the sky and the cloud boundaries. These features do not exist on a surface of a physical object and should be discarded. This is achieved by checking and removing all features that lie in a region previously classified as sky. All other features are kept.

The above feature extraction step is performed on each new image received. Tracks are formed by repeatedly associating features over consecutive frames. The feature association process has three stages: coarse association, feature alignment and feature verification. The first of these uses the navigation information of the aircraft to predict where the previous set of tracked features may be in the next frame, while the next two of the stages perform visual feature matching to align and validate the coarse matches.

During the coarse association step, the features being tracked in a frame are first projected into the new frame by taking into account the ego motion of the camera provided by the navigation information. As depth is generally unknown, the projection forms a line segment in the new image defined by the epipolar line. Association is performed by first generating an assignment cost matrix between the projected tracks and the newly extracted features. The association cost for each track/feature pair is the weighted sum of the distance the feature is from the end of the epipolar line (representing the feature projected to a depth of infinity) and the perpendicular distance from the line. Constraints are imposed to disallow physically infeasible matches based on the maximum expected uncertainties in cloud motion and aircraft positioning errors. The new features are associated to previous tracks through an incremental algorithm that assigns new features starting with the minimum cost pair and progressing through until no more valid assignments exist.

During the feature alignment, features that have been coarsely matched to a track are subsequently aligned to correct small discrepancies between the locations of extracted feature points on an object. The process uses the incremental Kanade-Lucas-Tomasi (found in the Sonka reference above) approach to find the optimal offset between the two images patches from the coarsely matched features. The approach is similar to that of H. Nguyen, J. Porway, P. Ramu, A. Ganguli & J. Yadegar, "EO/IR Due Regard Capability for UAS Based on Intelligent Cloud Detection and Avoidance", AIAA Infotech@Aerospace 2010, but only a single smoothing layer is used. This combination of the coarse association based on known camera ego motion and fine patch alignment allows a feature to be reliably tracked over video sequences captured at a low frame rate with large inter-frame image motion.

During the feature validation, to ensure the appearance of the new feature is consistent with the existing track and not from a different feature altogether, a visual validation is performed to ensure the aligned feature patches are a good match. The validation is performed by calculating the normalised cross correlation (see the Sonka reference). The normalised cross correlation allows for different illumination conditions and varies from a value of 1 for a perfect match to 0 for no match (a negative value can be produced by negative correlations). Poor matches are detected and discarded by thresholding the normalised cross correlation.

The associated, aligned and validated features are compiled over time and form tracks through image space. These tracks are used by the localisation and ranging system during the tracking process (part of step 406).

As part of the localisation and ranging step 408, a stationary feature can be localised in 3D space from two or more images acquired from different locations. An example of such a localisation and ranging solution is given in the Nguyen reference above. However, if the feature is moving, as clouds generally are, the approach can no longer be used. It is known that the trajectory of a moving feature with unknown velocity can, under specific conditions, be reconstructed from a moving camera (see the Avidan article reference above), however for the case of a cloud moving in the same horizontal plane as an aircraft, the problem is degenerate and range is unobservable. This problem may be overcome if the motion of all clouds is assumed to be constant and all cloud features tracked jointly, allowing for the velocity of clouds at different altitudes to be estimated and used to infer the velocity of clouds at the same altitude. However, this assumption is unlikely to be valid as the air mass at different altitudes is known to move at different speeds.

To overcome this unobservability issue introduced by unknown velocity, two different methods for feature localisation have been implemented and explored. Both methods are tailored for clouds at similar altitudes as the aircraft. The two methods will provide complementary functionality, with each able to localise features under conditions when the other is known to fail. Some embodiments may use either or both of these techniques.

The Object Expansion range estimation method exploits the observable expansion of objects as they move toward the camera and is based on the work of Y. Barniv, "Passive Ranging Using Image Expansion", IEEE Trans. Aerospace and Electronic Systems Vol. 31, No. 1 1995 and C. Raju, S. Zabuawala, S. Krishna & J. Yadegar, "A Hybrid System for Information Fusion with Application to Passive Ranging", In Proc. Int. Conf. on Image Processing, Computer Vision, and Pattern Recognition, 2007. It is particularly good at estimating the range to features in the direction of travel, but poor for estimating range to features out to the side or above or below the aircraft. In presenting the details of this method it is assumed that the feature point exists in the world at location $p=[p_x, p_y, p_z]^\tau$ and lies on a locally planar surface with normal $n=[n_x, n_y, n_z]^\tau$. This feature is observed from two locations, denoted by $C_o$ and $C_1$. Without loss of generality, it is assumed that $C_o$ is positioned at the origin and thus p and n are defined in the local coordinate system of $C_o$. The location and orientation of $C_1$, with respect to $C_o$, is defined by the translation and rotation matrices T and R respectively. In part (a) of FIG. 6 the geometry of the observations of the feature p and a surrounding point x lying on a plane with normal n is shown, whilst in part (b) images as collected from the two observation points, noting the shape of the observed pattern on the plane surrounding the feature will be warped when viewed in the second image. Thus, the feature appears in the images of $C_o$ and $C_1$ at the coordinates $$u_0^p = M\overline{p} \text{ and } u_1^p = M\overline{[R(p-T)]} \tag{6}$$

Due to the motion of the point p, these two equations cannot be used to recover the location of the feature. In developing the expansion method, let x be a point near the feature p on the planar surface and appears in $C_0$ and $C_1$ at the coordinates $$u_0^x = M\overline{x} \text{ and } u_1^x = M\overline{[R(x-T)]} \tag{7}$$

It is desired to find an expression for how the difference $u_1^p - u_1^x$ changes as a function of (among other things) the feature range and the difference $u_0^p - u_0^x$.

To start, note that the point x lies on the planar surface and thus $$n^T p = n^T x. \tag{8}$$

Let the depth of feature p from camera $C_0$ be $\gamma_p$ ($=p_z$), and similarly $\gamma_x$ be the depth of x. Thus, p can be written as $\gamma_p M^{-1} u_0^p$ and x can be written as $\gamma_x M^{-1} u_0^x$, allowing (8) to be rewritten as:

$$n^T \gamma_p M^{-1} u_0^p = n^T \gamma_x M^{-1} u_0^x. \qquad (9)$$

Hence $\gamma_x$ becomes $$\gamma_x = \gamma_p \frac{n^T M^{-1} u_0^p}{n^T M^{-1} u_0^x}. \qquad (10)$$

Now, x can be written as $$x = \gamma_p \frac{n^T M^{-1} u_0^p}{n^T M^{-1} u_0^x} M^{-1} u_0^x. \qquad (11)$$

Note that due to the matrix and vector multiplication, this cannot be simplified. Thus, the point $u_1^x$ can now be written as $$u_1^x = M \left[ R \left( \gamma_p \frac{n^T M^{-1} u_0^p}{n^T M^{-1} u_0^x} M^{-1} u_0^x - T \right) \right]. \qquad (12)$$
$$= f(u_0^p, u_0^x, n, \gamma_p, M, R, T)$$

Now, taking a $1^{st}$ order Taylor series expansion around $u_0^x = u_0^p + \Delta u_0$ for $\Delta u_0 = 0$ gives $$u_1^x = f(u_0^p, u_0^x, n, \gamma_p, M, R, T)|_{u_0^x = u_0^p} + \qquad (13)$$
$$\frac{\partial f}{\partial u_0^x}(u_0^p, u_0^x, n, \gamma_p, M, R, T)\bigg|_{u_0^x = u_0^p} \Delta u_0$$
$$= u_1^p + A \Delta u_0$$

Where A is the Jacobian matrix of f and is a function of $(u_0^p, n, \gamma_p, M, R, T)$ The form of the Jacobian determines how a visual pattern on the surface of the plane around the feature is transformed when viewed from a different location. In particular as only first order terms are considered this defines an affine transformation of this pattern, i.e. the perspective component is lost. This method is robust to the motion of the feature as it is the local differences between the points in the image that are used and not global displacements. The form of the Jacobian has been computed using MATLAB's Symbolic toolbox. The general form is very complex and will not be reproduced here. However, under specific conditions the Jacobian becomes:

$$A = \frac{\gamma_p}{\gamma_p - T_z} R_z(\theta_z) \qquad (14)$$

where $T_z$ is the z-component of the translation vector, i.e. translation along the optical axis of $C_0$ and $R_z(\theta_z)$ is the rotation matrix produced by a rotation about the optical axis. This form holds for a number of cases:

Translation only toward feature and camera does not rotate. That is $R = I_{3 \times 3}$ (i.e.) and $T \propto p$; and any arbitrary n, and $n_0^p$). This corresponds to the aircraft flying in a straight line toward a cloud feature.

Rotation about the optical axis is allowed and the full form of (14) is recovered if the feature is constrained to lie on the optical axis, i.e. camera is mounted to align to the direction of travel.

Surface normal is parallel to the optical axis and camera does not rotate, that is $n = [0, 0, 1]^T$ and $R = I_{3 \times 3}$ (i.e. $\theta_z = 0$). This form holds for any arbitrary $n_0^p$ and T. This corresponds to the aircraft approaching a cloud front that has the form of a vertical wall perpendicular to the direction of travel. This approximation holds for all points on the cloud front, not just points in the direction of travel.

In general, neither of these conditions will hold for general aircraft motion. It is noted that the approximation is particular poor for ground features, which usually exhibit a surface normal perpendicular to the direction of travel (and the optical axis of the camera) and will not often lie in the direction of travel.

In the Expansion Estimation and Ranging method, the range of the feature can be estimated if the affine warping matrix A can be estimated from the visual appearance of the image patch surrounding the feature in different frames. It is now assumed that A has the form defined in (14). The warp estimation method is based on the Barniv work referenced above and involves the solution to a nonlinear optimisation problem which incrementally warps one image patch in an attempt to match it to the original. The approach assumes the affine warping matrix has the form:

$$A = s R_z(\theta), \qquad (15)$$

and includes an offset term to allow fine adjustments to be made to the translations between the features to account for other accumulated errors. The optimisation is constrained to only consider the offset and scaling s as free variables, the rotation is fixed to a value extracted from the known aircraft navigation data. To improve the convergence properties of the non-linear optimisation, the gradient information of the image patches are smoothed. This allows the algorithm to converge and recover the scaling when initialised with a larger error. From the scaling factor s, the depth $\gamma_p$ and range can then be recovered using the known translation between frames $$\gamma_p = \frac{s}{s-1} T_z. \qquad (16)$$

It is noted that larger translations and scaling factors will provide more accurate range estimates. As part of the characterisation phase, the accuracy of which s can be estimated by solving the nonlinear optimisation problem has been explored. This enables error estimates to be generated for the computed range. In future A simpler analytical expression may be found for the Jacobian A, which when coupled to a more general affine warping estimation method (e.g. J. Shi & C. Tomasi, "Good Features to Track", IEEE Conf. Computer Vision and Pattern Recognition, 1994), will allow the effect of the surface normal to be estimated and compensated for, allowing greater ranging accuracy under a wider set of conditions.

In the Triangulation with Known Wind Velocity method, if the speed at which a feature is moving is known a priori, the estimation of its current location is equivalent to triangulating a stationary feature. It is noted, however, that this moving feature triangulation method suffers from the same pitfalls as standard triangulation of stationary features and requires the observation angle to change for the feature location to be able to be recovered. This is complementary to the previous expansion based method which requires the angle to remain constant.

It is expected that the speed at which the aircraft moves through the air can be recovered from the measured atmospheric temperature and pressure, and the aircraft's indicated airspeed. This information combined with the aircraft's yaw and true velocity obtained from GPS (and assuming zero side slip) allows the true velocity at which the air is moving to be estimated. Once the velocity of the air mass is known and used to infer the motion of cloud features, the feature localisation problem becomes a simple triangulation problem again, and can be solved in a similar manner to the stationary feature case.

It is noted that the velocity of the air mass varies as a function of altitude, thus this method is strictly only applicable for clouds at the same altitude as the aircraft. This may be extended by extended by employing a wind shear model and explicitly estimating the velocity of the air mass at different altitudes.

In the Cross Wind Estimation method, as the majority of the data used to estimate the motion of the air mass is not available in the currently logged data, nor expected in near term flight trials, this method includes the air velocity being manually defined as a configuration option. As a rudimentary alternative, the cross wind component of the air velocity, i.e. the component perpendicular to the principle axis of the aircraft, can be estimated from the difference between the aircraft yaw and the GPS derived velocity vector (crab angle) as depicted in FIG. 7. This captures the main effect that the wind velocity has on the ranging problem. However, this is still an approximation and the full velocity vector should be used if available.

In estimating the locations of the cloud features, the following assumptions are made:
  Each feature is tracked independently, i.e. the correlation between feature estimates introduced by the common navigation solution will be ignored.
  The estimated position and orientation and associated uncertainty of the camera is available for each frame (latitude, longitude, altitude, roll, pitch, yaw) and is assumed to be uncorrelated in time. (This includes errors introduced through time alignment of the video and navigation data sources).
  Estimated wind velocity is available, either from the cross wind estimation scheme above or from a more accurate estimation method using other data not currently available. The estimate is assumed to lie in the horizontal plane and has a known uncertainty and is assumed to be uncorrelated in time.

Tracking and localisation of a given feature is accomplished using a standard extended Kalman filter. The state space is defined as the 3D feature location $p=[p_x, p_y, p_z]^T$, which is predicted forward in time using the estimated wind velocity, denoted by $\omega=[\omega_x, \omega_y, 0]$, and augmented at each update cycle with the navigation solution of the camera, denoted by $\eta=[\eta_x, \eta_y, \eta_z, \eta_{roll}, \eta_{pitch}, \eta_{yaw}]^T$ Prediction—For a given estimate of the feature location $\hat{p}^{k|k}$ and covariance $p_p^{k|k}$, at a time $t^k$ and containing all observations up to time $t^k$, the predicted estimate at a later time $t^{k+1}=t^k+\Delta t^k$ can be computed using the estimated wind velocity $\hat{\omega}^k$, which has known covariance $p_\omega^k$ through:

$$\hat{p}^{k+1|k} = \hat{p}^k + \hat{\omega}^k \Delta t^k \qquad (17)$$
$$P_p^{k+1|k} = P_p^{k|k} + P_\omega^k (\Delta t^k)^2$$

Observation Update—For a given time $t^k$, the observation equation of the feature is given by $$u = h(p, \eta) = M[\overline{R(p-T)}], \qquad (18)$$

where R and T are both functions of the current navigation solution $\eta$. The Jacobians of this observation function are denoted by $H=[H_p, H_\eta]$. The updated estimate can be found by forming the intermediate state $$\hat{y} = [\hat{p}^T, \hat{\eta}^T]^T, \qquad (19)$$

which has covariance $$P_y = \begin{bmatrix} P_p & 0 \\ 0 & P_\eta \end{bmatrix}. \qquad (20)$$

The state estimate and covariance can be found using the standard Kalman filtering update equations $$\hat{y}^{k+1|k+1} = \hat{y}^{k+1|k} + K^{k+1}[u^{k+1} - h(\hat{y}^{k+1|k})] \qquad (21)$$
$$P_y^{k+1|k+1} = P_y^{k+1|k} - K^{k+1}H^{k+1}P_y^{k+1|k}$$

where the Kalman gain is $$K^{k+1} = P_y^{k+1|k}[H^{k+1}]^T[S^{k+1}]^{-1},$$

and $$S^{k+1} = H^{k+1}P^{k+1|k}[H^{k+1}]^T + R^{k+1}.$$

Here, $R^{k+1}$ is the observation noise and comes from the errors in associating and aligning the extracted features.

Track Initialisation—A newly observed feature that does not associate with other known tracks is used to create a new track. This is performed in a simple fashion by projecting the observation into the world coordinate system. This is performed at a nominal range with a nominal uncertainty. Although this initialisation will in generally be incorrect, due to the accuracy of the camera position (i.e. generally small $P_\eta$) the estimate generally converges to the correct estimate quickly and the initialisation procedure makes little difference.

The basic Kalman filtering framework outlined above allows the estimation framework to be tested and validated. However, this may be improved in several ways:
  Use a multiple hypothesis feature initialisation procedure, which instantiates multiple Gaussian estimates at different ranges. This is expected to improve the convergence speed and remove some of the early linearization errors. An example of such a method is provided in J. Sola, A. Monin, M. Devy & T. Lemaire, "Undelayed Initialization in Bearing Only SLAM", In Proc. Int. Conf. Itelligent Robots and Systems, 2005.

Replace Kalman framework with a particle filter. This removes all issues with feature instantiation and linearization errors but is expected to be slower.

Perform joint estimation of features. This exploits the fact that each image captures very accurate relative information regarding the bearings between different features. This will improve the position estimates of the features and also allow the rotational errors in the INS solution to be corrected.

To improve the ability of the system to accurately track features at different altitudes, a wind shear model should be employed and the feature velocity explicitly estimated within the filtering framework.

The expansion based ranging method outlined in above works best for objects in the flight path of the aircraft. This is complementary to the triangulation based method also discussed above, which requires the features to be observed from different angles and can only be used to determine the range to objects away from the direction of travel. These methods are can be implemented separately, but nay be beneficially combined. This may be performed by simply employing a switch based on the angle between the feature observation and the current velocity vector. However, more advanced methods may also be considered that statistically fuse the estimates from the different methods based on the estimated uncertainty provided by the methods. It is noted, that for an aircraft flying straight and level both methods will produce poor results in localising features that are at a significantly different altitude as the aircraft. This has a feedback effect on the classification algorithm, which is also often poor at classifying clouds that are below the horizon and appear very different to clouds above the horizon. As noted above, this may be overcome by employing wind shear models to allow the wind velocity at lower altitudes to be coupled to the feature location estimation framework.

Although the area below the horizon that is not classified as cloud is implicitly assumed to be surface, this is not expected to be a sufficient to allow the "is surface visible" condition of the regulations governing Visual Meteorological Conditions and Visual Flight Rules. This condition requires the surface is visible and objects on it are resolvable. To detect this condition the Kalman filtering framework defined above is used, but with the prediction step ignored. If any of the features become well localised and lie near the ground/sea level, a flag is raised. This indicates that the aircraft is allowed to fly closer to clouds, while remaining under Visual Flight Rules, than if features on the surface are not resolvable.

The invention claimed is:

1. A method of detecting cloud features, the method comprising:
   obtaining image data;
   identifying regions of the image data corresponding to a below-horizon region and an above-horizon region;
   classifying one or more parts of the above-horizon region as sky;
   classifying, as a cloud feature, each part of the above-horizon region that has not been classified as sky;
   determining an identification model specifying a visual appearance of some or all of the parts of the above-horizon region that have been classified as a cloud feature; and
   using the determined identification model, classifying, as cloud features, those regions of the of the below-horizon region whose visual appearance is as specified by the identification model; wherein
   the step of classifying one or more parts of the above-horizon region as sky comprises:
   computing image gradients for Red-Green-Blue channels of the image data in directions tangential and normal to a horizon line;
   smoothing, by averaging over a local circular neighborhood, the computed image gradients for the Red-Green-Blue channels;
   summing the smoothed Red-Green-Blue channel image gradients to produce a combined smoothness value of each pixel in the directions tangential and normal to the horizon line;
   selecting a part of the above-horizon region in which, for each pixel in that part, the combined smoothness values of that pixel in directions tangential and normal to the horizon line are below a predetermined threshold value; and
   classifying the selected part as sky if properties of pixels within the selected part fulfil one or more predetermined criteria.

2. A method according to claim 1, wherein the one or more predetermined criteria are selected depending on one or more parameters selected from the group of parameters consisting of: a time of day, lighting conditions, environmental conditions.

3. A method according to claim 1, wherein the properties of pixels are color properties of the pixels.

4. A method according to claim 3, wherein the step of classifying the selected part as sky if properties of pixels within the select part fulfil one or more predetermined criteria comprises classifying the selected part as sky if the pixels within that part have a strong blue color.

5. A method according to claim 4, wherein a pixel in the selected part is determined to have a strong blue color if:
   (i) blue is a strongest RGB component of the pixel, and
   (ii) a saturation value of the pixel is above a predefined threshold.

6. A method according to claim 1, wherein the step of computing an image gradient in directions tangential and normal to the horizon comprises:
   using image data, determining a horizon line;
   determining a first direction parallel to the horizon line;
   calculating image gradients in a direction parallel to the first direction;
   determining a second direction perpendicular to the horizon line; and
   calculating image gradients in a direction parallel to the second direction.

7. A method according to claim 1, further comprising:
   smoothing the each of the channels by averaging over a local circular neighborhood, and
   summing the channels to produce a combined smoothness value of a pixel in the tangential and normal directions.

8. A method according to claim 1, further comprising classifying parts of the below-horizon region as surface.

9. A method according to claim 1, wherein the identification model is a color based model based on appearance of at least one said cloud feature in the above-horizon region.

10. A method according to claim 1, including a feature extraction step to detect visual features corresponding to a potential said cloud feature in a greyscale version of the image data.

11. A method according to claim 10, wherein the feature extraction detection comprises searching over multiple scales of the image data and extracting image patches that contain texturing and local intensity peaks.

12. A method according to claim 10, further comprising associating said visual features over multiple frames of the image data using navigation data.

13. A method according to claim 12, wherein the association of the visual features is used to produce temporal tracks of motion of the visual features through image space.

14. A method according to claim 13, further comprising generating information relating to range of a said cloud feature by computing scaling of a said visual feature corresponding to the cloud feature from an earlier said frame into a later said frame.

15. A method according to claim 13, further comprising generating information relating to range of a said cloud feature by:
- estimating velocity of movement of air in which the cloud feature is located;
- obtaining information regarding position and velocity of an aircraft that produced the image data at a time corresponding to the frame of the image data, and
- using a triangulation technique based on the estimated velocity, the aircraft position and the aircraft velocity to determine the range of the cloud feature.

16. A non-transitory computer-readable storage medium storing a computer program or plurality of computer programs, the computer program or plurality of computer programs being arranged such that, when executed by a computer system or one or more processors, it/they cause the computer system or the one or more processors to operate in accordance with the method of claim 1.

17. A non-transitory computer-readable storage medium storing a computer program or at least one of the plurality of computer programs according to claim 16.

18. An apparatus for detecting cloud features comprising:
one or more cameras configured to obtain image data; and
one or more processors operatively coupled to the one or more cameras and configured to:
identify regions of the image data corresponding to a below-horizon region and an above-horizon region;
classify one or more parts of the above-horizon region as sky;
classify, as a cloud feature, each part of the above-horizon region that has not been classified as sky;
determine an identification model specifying a visual appearance of some or all of the parts of the above-horizon region that have been classified as a cloud feature; and
using the determined identification model, classify, as cloud features, those regions of the of the below-horizon region whose visual appearance is as specified by the identification model; wherein
the one or more processors are further configured to:
compute image gradients for Red-Green-Blue channels of the image data in directions tangential and normal to a horizon line;
smooth, by averaging over a local circular neighborhood, the computed image gradients for the Red-Green-Blue channels;
sum the smoothed Red-Green-Blue channel image gradients to produce a combined smoothness value of each pixel in the directions tangential and normal to the horizon line;
select a part of the above-horizon region in which, for each pixel in that part, the combined smoothness values that pixel in directions tangential and normal to the horizon line are below a predetermined threshold value; and
classify the selected part as sky if properties of pixels within the selected part fulfil one or more predetermined criteria.

19. An aircraft comprising apparatus according to claim 18.

* * * * *